United States Patent [19]

McGee et al.

[11] Patent Number: 4,757,224
[45] Date of Patent: Jul. 12, 1988

[54] FULL FLUX REVERSAL VARIABLE RELUCTANCE MACHINE

[75] Inventors: Daniel W. McGee; Frederick B. Reiter, both of Fairfield, Iowa; Vamaraju S. R. Murthy, St. Louis, Mo.

[73] Assignee: Magnetics Research International Corp., Fairfield, Iowa

[21] Appl. No.: 911,379

[22] Filed: Sep. 24, 1986

Related U.S. Application Data

[63] Continuation-in-part of Ser. No. 727,441, Apr. 26, 1985.

[51] Int. Cl.⁴ .............................................. H02K 17/42
[52] U.S. Cl. ................................. 310/168; 310/111; 310/156; 310/181
[58] Field of Search ............... 310/168, 155, 111, 261, 310/169, 170, 162, 156, 172, 166, 46, 154, 181, 152; 322/47

[56] References Cited

U.S. PATENT DOCUMENTS

| | | | |
|---|---|---|---|
| 2,796,542 | 6/1957 | Bekey | 310/168 X |
| 3,069,577 | 12/1962 | Lee | 310/166 |
| 3,071,703 | 1/1963 | Mathews | 310/168 X |
| 3,132,269 | 5/1964 | Craske | 310/168 X |
| 3,221,196 | 11/1965 | Henry-Baudot | 310/268 |
| 3,230,406 | 1/1966 | Henry-Baudot | 310/155 |
| 3,293,469 | 12/1966 | Crawford et al. | 310/168 |
| 3,315,106 | 4/1967 | Reynst | 310/265 |
| 3,321,652 | 5/1967 | Opel | 310/168 |
| 3,389,281 | 6/1968 | Ellis | 310/168 |
| 3,396,291 | 8/1968 | Somerville | 310/168 X |
| 3,401,284 | 9/1968 | French | 310/168 |
| 3,401,287 | 9/1968 | French et al. | 310/168 |
| 3,470,408 | 9/1969 | Lewis et al. | 310/168 |
| 3,471,728 | 10/1969 | Noble | 310/154 |
| 3,484,635 | 12/1969 | MacKallor, Jr. | 310/266 |
| 3,529,191 | 9/1970 | Henry-Baudot | 310/178 |
| 3,549,923 | 12/1970 | Kurakin et al. | 310/162 |
| 3,558,947 | 1/1971 | Burr | 310/154 |
| 3,673,446 | 6/1972 | Watai et al. | 310/172 |
| 3,729,642 | 4/1973 | Esters | 310/112 |
| 3,821,575 | 6/1974 | Colosimo | 310/177 |
| 3,983,430 | 9/1976 | Howard | 310/155 |
| 4,091,300 | 5/1978 | Lynch et al. | 310/154 |
| 4,110,645 | 8/1978 | Hendershot, Jr. | 310/154 |
| 4,243,903 | 1/1981 | Mishima | 310/154 |
| 4,390,805 | 6/1983 | Hahn | 310/190 |
| 4,451,749 | 5/1984 | Kanayama et al. | 310/62 |
| 4,639,626 | 1/1987 | McGee | 310/155 |

Primary Examiner—R. Skudy
Attorney, Agent, or Firm—Bell, Seltzer, Park & Gibson

[57] ABSTRACT

A full flux reversal variable reluctance machine is disclosed. The stator includes a plurality of poles and electrical windings surrounding a portion of the stator. The rotor comprises main and shunt components that have alternate sections of high and low magnetic permeability. The shunt and main components are magnetically isolated, and the sections of high and low magnetic permeability for one component are complementary to the sections on the other component. Variations in flux magnitude and direction are induced in the stator without reversing the flux direction in the rotor.

33 Claims, 6 Drawing Sheets

FULL FLUX REVERSAL VARIABLE RELUCTANCE MACHINE

This application is a continuation-in-part of Application Ser. No. 727,441 filed Apr. 26, 1985, entitled Permanent Magnet Variable Reluctance Generator.

FIELD OF THE INVENTION

This invention relates generally to a motor-generator machine that operates by changing the magnitude and direction of the magnetic flux through a winding on the stator without changing the direction of the magnetic flux in the rotor. This selective full flux reversal is accomplished through the use of a multipart rotor having complementary and magnetically isolated segments.

BACKGROUND OF THE INVENTION

In the past, motor-generators (hereinafter referred to as "machines") have been used in specific applications based upon their operating characteristics and size. For instance, the electrical type may be alternating current induction, synchronous, or series; or direct current series, permanent magnet, shunt, or compound; or universal. The speed variability may be classified as constant speed, varying speed, adjustable speed, adjustable varying speed, or multispeed. The mechanical protection and cooling may be open or totally enclosed, or it may be ventilated, water cooled, air cooled, fan cooled, etc. Through its unique structure, the machine of the present invention has combined many of the optimum operating characteristics of the different types of motors. It combines synchronous and induction characteristics in a solid rotor machine that utilizes permanent magnets. It may be used in different environments, with alternating current or direct current, and it provides a constant torque output through its speed range, which includes very high speeds due to its solid rotor construction.

The machine of the present invention is based upon the same laws of electromagnetism utilized in conventional machines, but is different in its configuration and mode of operation. For instance, most prior generators are characterized by relative motion between a coil of wire and a magnetic field such that the wire cuts through the lines of force of the magnetic field to generate electricity in the coil. This requires electrical windings on a rotor, the use of slip rings or brushes to accommodate the rotation of the windings or to commutate the flow of electricity, and the maintenance of a rotating electrical connection. Some of the problems associated with such a design include the continuous attention required by slip rings or brushes, the serious operational hazards arising from the continuous arcing and sparking as the rotor contacts move past the stationary brush. Slip rings and brushes also degrade operational efficiency through electric power loss from the electrical resistance of the brush contact, and through mechanical friction loss from the drag of the brushes on the rotor. The presence of windings on the rotor also significantly increases the weight or mass of the rotor, necessitating slower rotational speeds and more energy from the prime mover. Still further, the constant rotation, heating, and magnetic forces exerted on the coils and their insulation causes them to fatique, crack, degrade, and ultimately fail with time.

Some prior machines have functioned without slip rings or brushes, but have other inherent limitations. For example, inductor machines vary the magnetic path induction by means of a wireless toothed rotor. The field is maintained by electromagnets on the stator, and the armature coils are also wound on the stator. However, inductor machines have not found widespread acceptance since they are more bulky and less efficient than more traditional brush and slip ring machines.

More recent solutions to these problems have been found by mounting permanent magnets, rather than electromagnets, on the rotor. This eliminates the need for rotating electrical connections, saves the electrical power otherwise expended in exciting the field, lessens the amount of internal heat generation, and increases power density. However, such permanent magnet machines are limited in application since they have no viable means for controlling operation with changes in load.

Further aspects of prior machines which detract from performance include full reversal of the magnetic field throughout the machine, resulting in hysteresis loss, eddy current loss, and heat production; rotors made of different materials, which result in non-uniform expansion, mechanical stress, and eddy current loss; non-uniformity of torque with respect to speed, producing higher harmonics which reduce output quality and efficiency; and magnetic paths that operate at less than full saturation, resulting in a low energy density and an increase in bulk and weight.

The present invention incorporates the positive characteristics of many of the different machine types, including but not limited to those discussed herein. Further, it eliminates or mitigates many of the problems associated with earlier machine designs.

The efficiency and operational characteristics of the machine are improved as a result of several factors. The present invention utilizes permanent magnets and a multicomponent rotor. Rotation of the rotor induces variations in flux magnitude and flux direction (i.e. flux reversals) in the stator without reversing the flux direction in the rotor. Thus, flux reversals are limited to that portion of the stator surrounded by the stator windings. It is usually preferred that the flux magnitude in the rotor remain constant, but it may vary as necessary or desirable. The rotor routes the flux through the magnetically isolated and separate rotor components, and reverses the flux flow as it spins, even at high speed. This avoids undesirable flux cancellation and heat built up, and accomplishes a very high energy density. Substantially all of the magnetically permeable paths are fully saturated at all times, reducing the amount of iron, bulk and weight, and increasing the horse-power to weight ratio. The magnetic field is supplied by permanent magnets, eliminating the primary field current and brushes or slip rings. This also increases the power density through flux squeezing and decreases heat production. The essentially constant field strength, along with use of a properly shaped and spaced permeable portions of the rotor, results in a more uniform torque, or voltage output, that is virtually free of higher harmonic distortion. If the magnetic means is stationary and attached to the end bell, higher speeds and larger rotors are possible, ruggedness and reliability are improved, conventional design and manufacturing techniques may be utilized, and assembly and disassembly is easier. And, with the magnetic means located on the end bell, it is thermally isolated from the remainder of the magnetic circuit by the air gap, minimizing the degradation of the permanent magnets with increasing temperatures.

Generators relying upon permanent magnets for excitation and operation may suffer from a drop in voltage as current is drawn out. This problem arises from the inability to control the magnetic field to compensate for the voltage drop. However, the present invention uses its unique design and permanent magnets coupled with voltage regulation windings which are energized to increase or decrease the magnetic flux as necessary. The voltage control windings are also selectively energized to assist in suppressing voltage surges or spikes.

When operated as a motor, the machine of the present invention may be operated as a constant speed motor by adding damping windings to improve starting torque and eliminate unwanted oscillations during load changes. It may be operated as a variable speed motor by coupling it with an inverter that locks the rotor into synchrony at a low speed and brings the rotor up to high speeds as desired.

The machine may be operated as a single phase or polyphase system, making it more versatile for sophisticated application, including co-generation.

Thus, it is an object of the present invention to provide an improved motor-generator that combines the optimum operating characteristics of different types of machines.

It is a further object of the present invention to provide a machine that operates by changing the magnitude and direction of the magnetic flux through a winding on the stator without changing the direction of the flux in the rotor.

It is a further object of the present invention to provide a machine having a multipart rotor with complementary and magnetically isolated components.

It is a further object of the present invention to provide a machine with a solid rotor, and one that is capable of high speed operation.

It is a further object of the present invention to provide a machine that makes efficient use of high energy permanent magnets.

These and other objects are met by the machine of the present invention.

SUMMARY OF THE INVENTION

The invention is a full flux reversal variable reluctance machine. It includes an annular stator having a plurality of fixed poles with faces that define an annular stator surface. At least one electrical winding surrounds a portion of the stator. A magnetically permeable rotor is in magnetic circuit with certain of the pole faces of the stator. The rotor comprises a main component having alternate sections of high and low magnetic permeability for varying the magnetic permeability between a first pair of non-adjacent stator poles. A rotor shunt component is magnetically isolated from the main component and also includes alternate sections of high and low magnetic permeability. The sections of high and low magnetic permeability for the shunt component are complementary to the sections of high and low magnetic permeability of the main rotor component, and they vary the magnetic permeability between a second pair of non-adjacent stator poles to form a magnetic circuit with the first pair of stator poles in the main component. Magnetic means for generating a magnetic flux are in magnetic circuit with the main and shunt rotor components so that rotation of the rotor induces variations in flux magnitude and direction in the stator without reversing the flux direction in the rotor. Different embodiments are disclosed herein.

DESCRIPTION OF THE INVENTION

While the invention will be described in connection with several embodiments, it will be understood that the invention is not limited to the embodiments disclosed. This description is intended to be exemplary and cover all alternatives, modifications and equivalents as may be included within the spirit and scope of the invention as defined by the appended claims.

Figure 1:
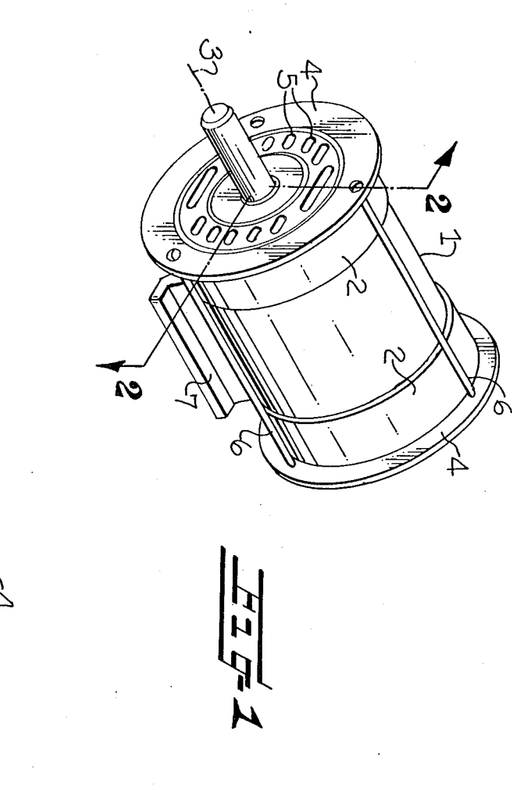
FIG. 1 is a perspective view of the exterior of the machine of the present invention.

Referring to FIG. 1, the full flux reversal variable reluctance machine of the present invention is illustrated. It includes a cylindrical outer case 1 which may be made of a suitable non-magnetic material. Annular case extensions 2 may be used as necessary or desirable. The case and case extensions together define a longitudinal axis 3 for the machine. End bells 4 are transversely positioned with respect to the longitudinal axis and are attached to the case, or extensions, by bolts 6 or the like. The end bell may also define ventilation slots 5 for the passage of cooling air through the machine. A mounting platform 7 may be used to secure the machine in place. Bearings 8 are attached to and supported along the central axis 3 by end bells 4.

Figure 2:
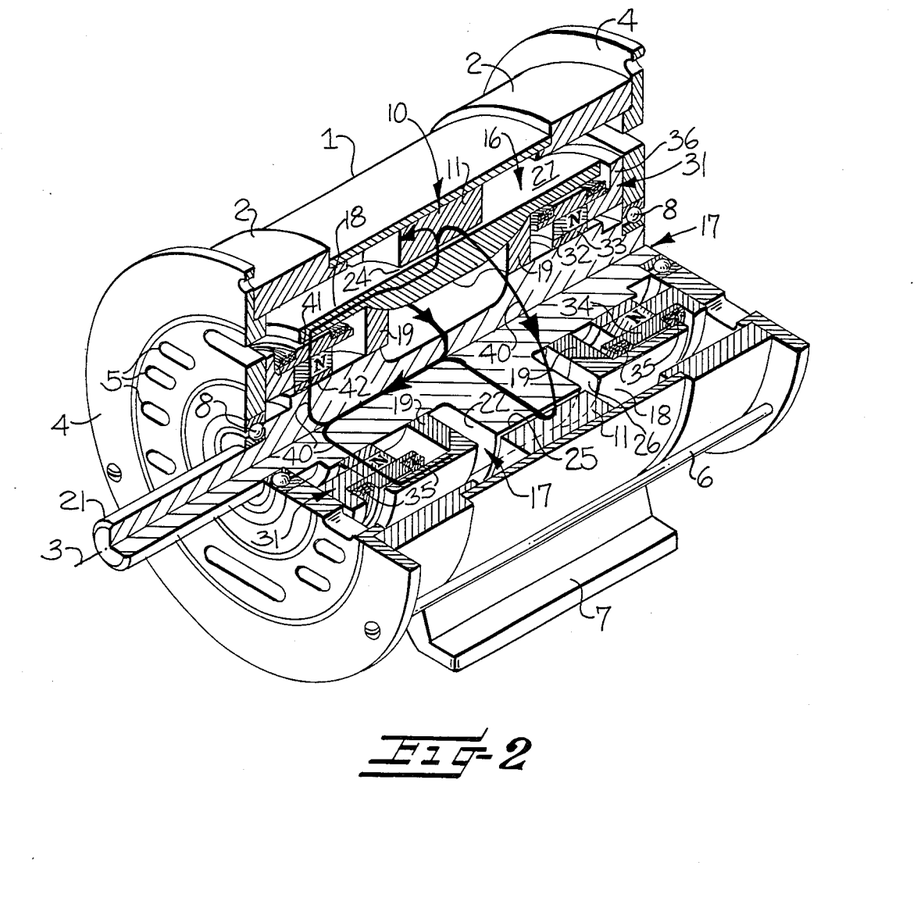
FIG. 2 is a perspective view of the machine of the present invention with sections taken at right angles along the line 2—2 of FIG. 1.
Figure 3:
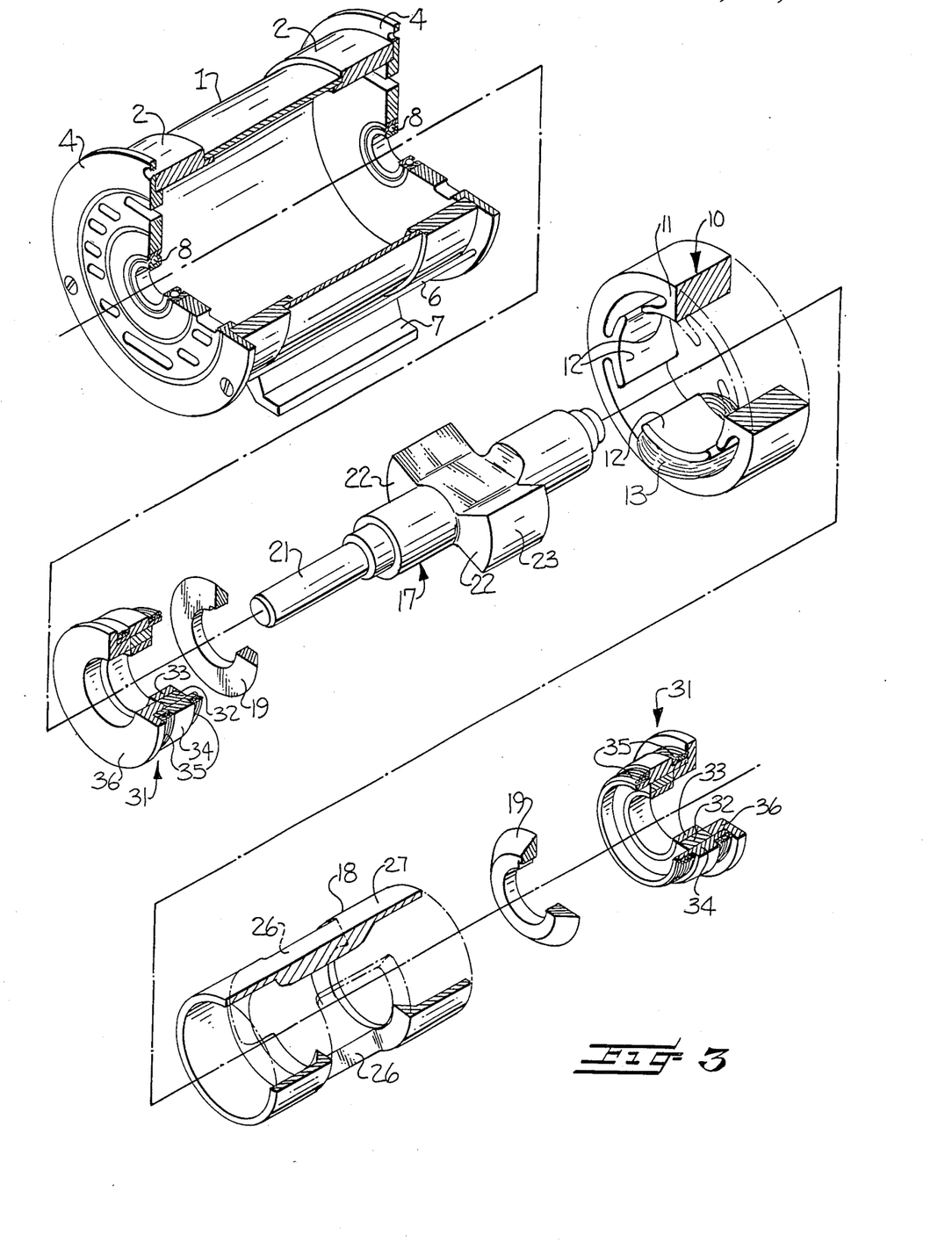
FIG. 3 is an exploded view of the machine of FIG. 2.

Referring FIGS. 2 and 3, the stator 10 is annular and comprised of a magnetically permeable material. It defines a plurality of fixed poles 11 in magnetic circuit with each other that extend radially inwardly toward the longitudinal or central axis 3. Each pole defines a pole face 12, and the pole faces together define a toothed annular stator surface around the central axis. The number of poles may vary as necessary or desirable. Adjacent poles define slots therebetween to receive electrical windings 13 which encircle one or more poles. The number of stator poles, the number of stator windings, the number of poles encircled by each winding, the number of turns per winding, the nature of the interconnections from one winding to another, if any, and the phase of the excitation current for a motor may be changed as necessary or desirable to accommodate or generate the desired electrical characteristics.

The rotor 16 comprises a shunt component 17, a main component 18, and shunt supports 19. The shunt component 17 includes a shaft 21 that is journalled for rotation around the central axis 3. The shunt component includes a predetermined number of radially extending shunt segments 22 having segment faces 23 that form sections of a cylinder coaxial with the central axis 3. The surface area of the segment face 23 preferably corresponds substantially to the surface area of each corresponding pole face 12, and defines an air gap 25 therebetween. The rotor shunt component, including segments 22, is made of highly permeable magnetic material with each of the segments defining a section of high magnetic permeability and the space between the shunt segments defining sections of low magnetic permeability. The shunt shaft 21 may be used as a power output or input, and is supported by the bearings 8.

The rotor main component 18 comprises an open end cylinder or tube of highly permeable magnetic material that is mounted coaxially with the central axis. The cylinder defines apertures or windows 26 at predetermined locations. The configuration of the aperature corresponds to the configuration of the segment face 23 of the shunt component so that these portions are circumferentially complementary when the rotor main and shunt components are assembled. Highly permeable material defines sections of high magnetic permeability, and the apertures define sections of low magnetic permeability. The spacing between the rotor shunt and main components is substantially greater than the air gap spacing between either of the rotor components and the stator pole faces to minimize flux leakage between the two rotor components and maximize the transfer of flux across the air gap between the rotor and the stator. The outer curvilinear surface of the main rotor component is coaxial with the pole faces 12, and the central portions of the main rotor component form an air gap 24 with the stator pole faces 12. The main component extends longitudinally to a position proximate each of the end bells to overlie the magnetic means. The main component is radially thicker proximate the poles to accommodate the flux, yet thinner at the opposite ends since the flux will divide and flow in either direction, reducing the flux density.

Figure 4:
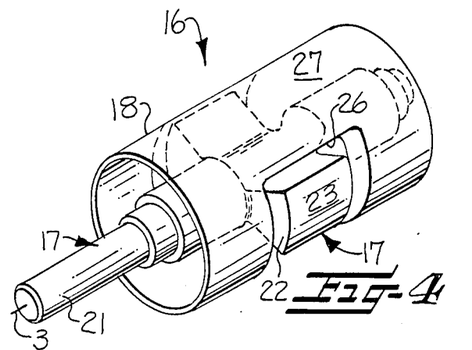
FIG. 4 is a perspective view of the rotor of the present invention illustrating the main and shunt components.
Figure 5:
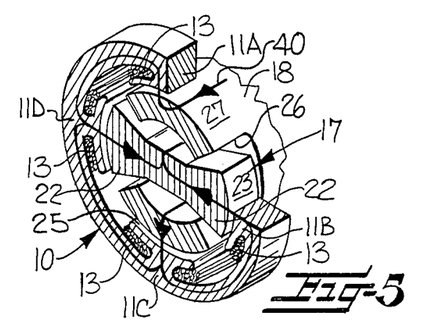
FIG. 5 is a schematic cross-sectional view taken through the stator and rotor perpendicular to the central axis of the machine.

The shunt supports 19 are made of material that is not magnetically permeable and magnetically isolates the rotor shunt component from the rotor main component. The supports also fix the positions of the main and shunt components with respect to each other so that the shunt segments 22 are positioned in the apertures 26 of the main component, forming a solid rotor. See FIGS. 4, 5, and 6. Referring to FIG. 5, the main rotor component 18 provides a magnetically permeable path between a first pair of non-adjacent stator poles 11A and 11C. The rotor shunt component 17 provides a magnetically permeable path between a second pair of non-adjacent stator poles 11B and 11D.

The rotor illustrated is free of electrical windings and laminations so that the machine is bushless. It may be comprised of a cast ferromagnetic material, and the shunt segments 22 may be attached to the shaft by any suitable means including casting as a single unit. It is preferred that the outer face of each segment 23 be substantially coincident with the cylinder defined by the outer surface 27 of the main rotor component.

Figure 6:
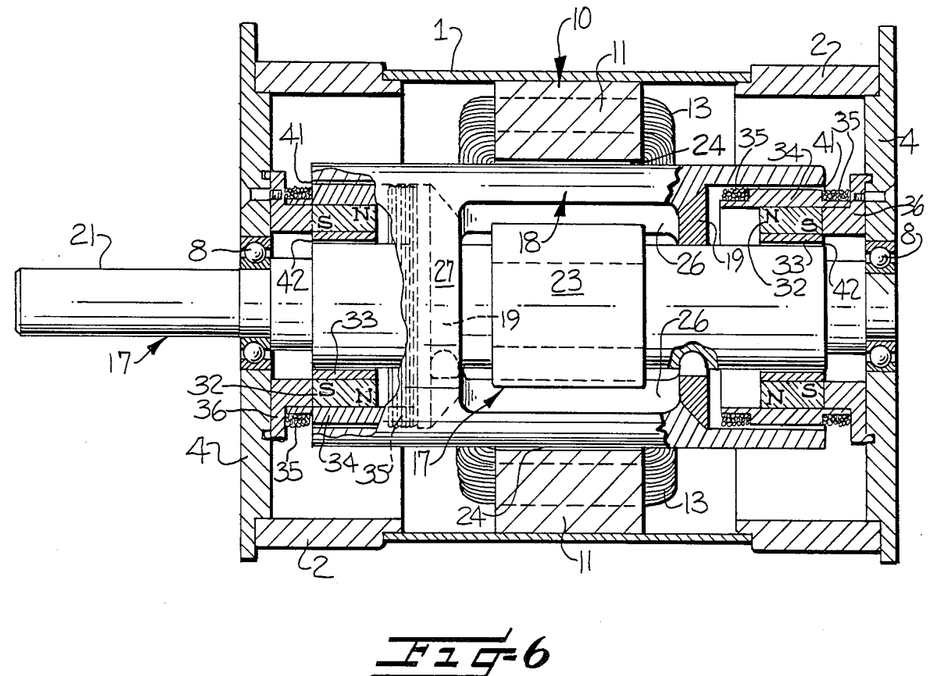
FIG. 6 is a cross-sectional elevational view of the stator, case, and magnetic means for the present invention, with portions of the rotor broken away for clarity.

The magnetic means 31 includes the permanent and electromagnets. Referring to FIGS. 2, 3 and 6, the permanent magnets 32 are formed into an annular ring magnetized radially. High energy magnets, such as neodymium-iron-boron magnets, are suitable. A collector ring 33 of magnetically permeable material is magnetically linked with the inner magnet surface and provides a smooth face for a uniform magnetic field. A magnetically permeable annular spool 34 is magnetically linked with the outer magnet surface and also provides a smooth face for a uniform magnetic field. It also includes peripheral L-shaped ledges to receive any voltage regulation windings 35 that, when energized, add to or detract from the magnetic field from the permanent magnets 32. Annular support 36 assists in retaining these elements of the magnetic means and attaching them to the end bell coaxial with the central axis of the machine. The inner surface of the collector ring 33 and outer surface of the shunt shaft 21 form an air gap 42, and the outer surface of the spool 34 and the inner surface 28 of the main rotor component form an air gap 41.

Referring to FIGS. 2 and 5, the flux loops 40 in a portion of the machine are illustrated. Beginning with the north pole N of the magnetic means 31, the flux moves radially outwardly through the spool 34 and air gap 41 to enter the inner surface 28 of the main rotor component. The flux continues axially along the length of the main rotor component towards the center to the air gap 24 between the outer surface 27 of the main rotor component and inner pole surface 11 of the stator 10. Upon entering the stator 10, the flux splits and moves circumferentially (see pole 11A in FIG. 5) to an adjacent pole in magnetic circuit with the rotor shunt component 17 (see pole 11D in FIG. 5). The flux continues radially inwardly through stator pole 11, across air gap 25, and into rotor shunt segment 22. The flux continues axially outwardly toward the magnetic means 31 and then radially outwardly from the shunt shaft 21, across air gap 42 and into collector ring 33 to return to the south pole of the permanent magnet 32. As illustrated in FIG. 5, the flux flow in the rotor is unidirectional regardless of the rotational position of the rotor. The flux flow in the stator alternates direction as the alternating faces of the rotor shunt and main component are placed into magnetic circuit with the stator poles by rotation of the rotor. Although not illustrated in the figures, the flux flows in substantially all portions of the stator and rotor at all times.

As shown in the drawings and as described herein, the magnetic means and magnetic circuit may vary as necessary or desirable. For example, the magnetic means may be attached to the (rotor not shown in the drawings), sandwiched between the shunt shaft 21 and inner surface 28 of the main rotor component to eliminate the air gaps 41 and 42, yet still provide a solid rotor for high speed operation. Similar modifications may be made to the machine illustrated in FIG. 7 to place the magnetic means, using either electromagnets or permanent magnets, between the shunt shaft 121 and the inner surface 128 of the main rotor component. This eliminates the air gaps 143 and 144. It should be noted that one advantage of the air gap between the rotor and magnetic means is the thermal barrier which insulates the permanent magnets from the heat generated in the rotor. The voltage regulation or control windings may then be removed from the rotor and placed elsewhere to provide a rotor free of windings, or entirely eliminated depending upon the desired operational characteristics. Still further, multiple magnetic means may be used as shown in FIG. 1-6, or a single magnetic means may be used as shown in FIG. 7.

Figure 7:
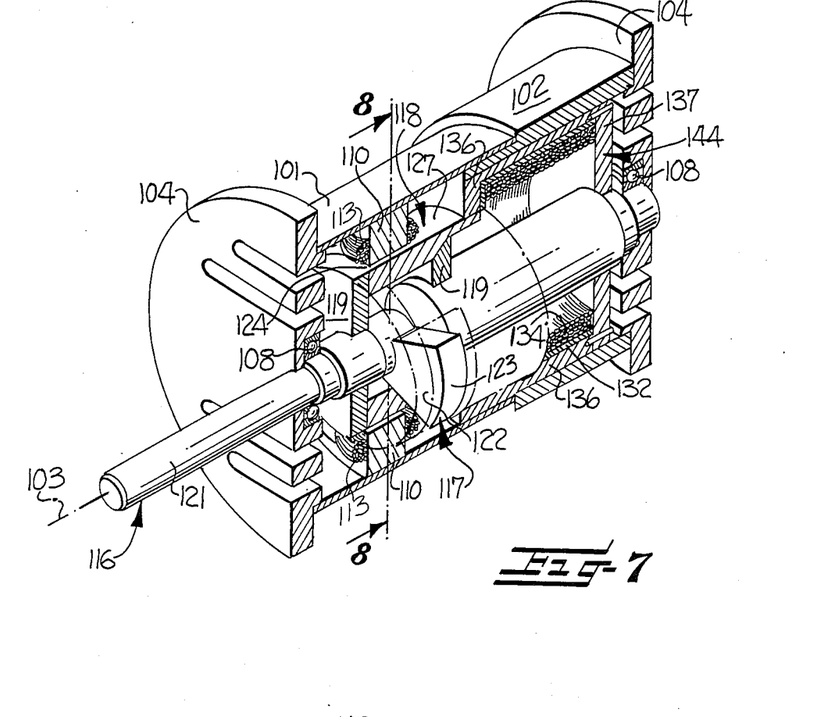
FIG. 7 is a cross-sectional perspective view of the stator, case, magnetic means and main rotor components for an alternate embodiment of the invention, with the shunt rotor component shown in full.

FIG. 7 illustrates an alternate embodiment of the present invention using a single electromagnetic magnetic means. It includes a cylindrical case 101 having a cylindrical case extension 102 defining a central axis 103. End bells 104 define the end of the machine and support the bearings 108 for the rotor shaft. An annular stator 110 is used, as described in connection with FIGS. 1-6.

The rotor 116 includes a shunt component 117 and main component 118, each magnetically isolated from the other. Shunt supports 119 retain the two components in position, fixed out of phase with respect to each other. The shunt shaft 121 extends coaxially with the central longitudinal axis of the machine and includes radially extending shunt components 122 forming a segment face 123 that forms a segment of a cylinder coaxial with the longitudinal axis 103. The segment face 123 and pole faces together define an air gap.

The main rotor component 118 comprises a cylinder that is coaxial with the longitudinal axis 103. The outer surface 127 of the cylinder is coincident with the cylindrical surface defined by the segment face 123 of the rotor shunt. The main rotor component also defines apertures through which the shunt segments 122 extend. As noted earlier, the apertures correspond in size and shape with the segment faces 123. The rotor configuration is substantially the same as illustrated in FIG. 4, with the omission of that portion forming an air gap over the left hand magnetic means.

The magnetic means include an electrical coil 132 in spool 134, both being coaxial with the longitudinal axis 103. A generally cylindrically shaped support 136 is magnetically linked with a support disk 137, and together they position the magnetic coil and maintain it in magnetic circuit with the rotor components.

Figure 8:
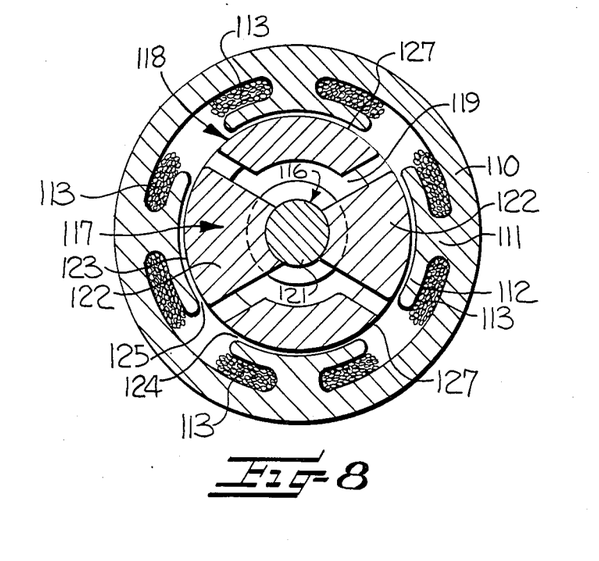
FIG. 8 is a cross-sectional view taken along line 8—8 of FIG. 7, perpendicular to the longitudinal axis of the machine.

In operation, and also referring to FIG. 8, the electromagnet is energized causing flux to flow axially out from the electrical coil 132 into the support disk 137, radially inwardly to the shunt shaft 121 across air gap 144, axially toward the shunt segments 122, radially outwardly through the shunt segments 122, across the air gap 125 and into the stator 110, circumferentially around the outside of the stator to an adjacent pole, radially inwardly through the pole, across the air gap 124 and into the outer surface 127 of rotor main component, axially along the main rotor component 118, and radially outwardly across air gap 143 into the annular support 136, and axially back to the south pole of the electromagnet 132. As noted in connection with the first embodiment, the flux is unidirectional in the rotor, and changes direction only in the stator.

Preliminary specifications for an AC motor in a case having a 7.75 inch diameter and 11.11 inch length, with a suitable controller, are:

| | | | |
|---|---|---|---|
| HP (@ 1800 RMP) | 3 | TORQUE FL (lb-in) | 105 |
| RPM | 0-10,000 | FL EFF. % | 91 |
| VOLTAGES | 208 | SERVICE FACTOR | 1 |
| PHASES | 3 | DUTY CYCLE | Continuous |
| CURRENT (amps) | 7.5 | | |
| Full Load | | MAX AMBIENT TEMP | 40° C. |
| TORQUE (% of FL) | 190 | | |
| Breakdown | | MAX TEMP RISE | 100° C. |
| | | WT (lbs) | 71 |

Referring to FIGS. 9-16, a still further alternate embodiment of the present invention is disclosed which utilizes a pair of stators surrounded by a two part rotor with cantilevered arms. The machine includes a cylindrical outer case 201 which may be made of a suitable non-magnetic material. The case defines a longitudinal axis 203 for the machine. End bells 204 are transversely positioned with respect to the longitudinal axis and are held against the case by bolts 206 or the like. The end bells may include ventilation slots for the passage of cooling air through the machine. The stators 210 (FIGS. 11 and 16) are annular and comprise magnetically permeable material defining a plurality of fixed poles 211 that extend radially outwardly from the longitudinal axis 203. Each pole defines a pole face 212 and the pole faces together define a toothed annular stator surface around the central axis. Each pole is in magnetic circuit with every other pole, and the number of poles may vary as necessary or desirable. Adjacent poles define slots therebetween to receive electrical windings 213 which encircle one or more poles. The number of windings, the poles encircled by each winding, etc., may vary as necessary or desirable.

The rotor comprises a shunt component 217, a main component 218, and a shaft 221. The main component 218 generally comprises a pair of back-to-back U-shaped members comprised of magnetically permeable material. Each U-shaped member includes a disk portion 219 transversely fixed to the shaft 221 for rotation therewith. A pair of arms 220 extend coaxially from the edge of the disk 219 in a cantilevered or claw-like fashion. The arms are fixed 180° out of phase with respect to each other, are comprised of magnetically permeable material, and are magnetically linked with the magnetically permeable disk portion. The arms are disposed at a predetermined radius from the central axis to form a small air gap 223 between the inner surface of the arm and the outer surface of the pole face 212. The two U-shaped members comprising the rotor main components are magnetically isolated from one another and separated by the magnetically non-permeable shaft and rotor supports.

Figure 9:
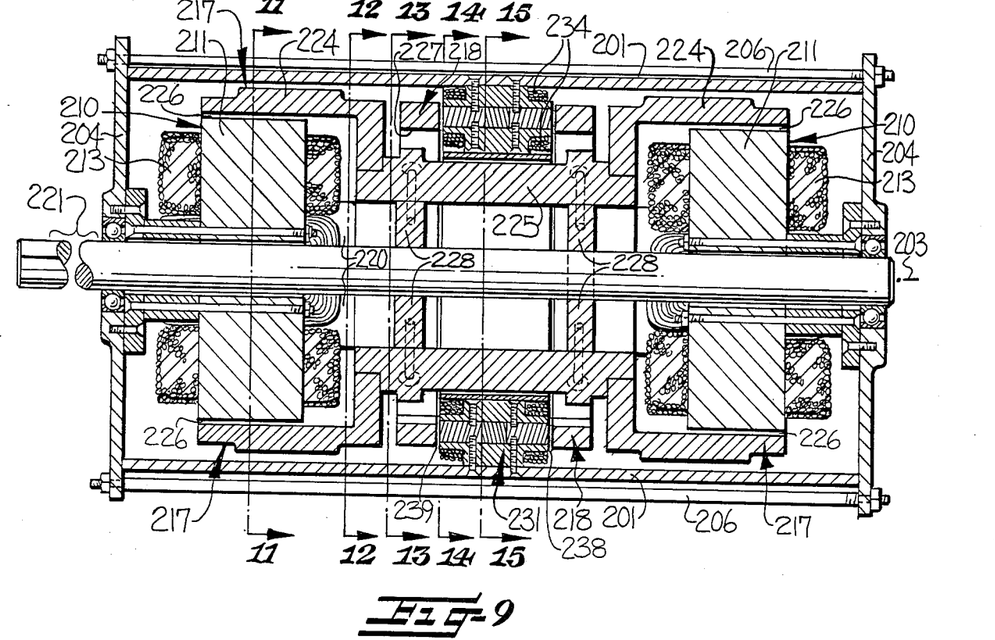
FIG. 9 is a cross-sectional view of another alternate embodiment of the invention, with the shaft shown in full, taken along the longitudinal axis of the machine.
Figure 10:
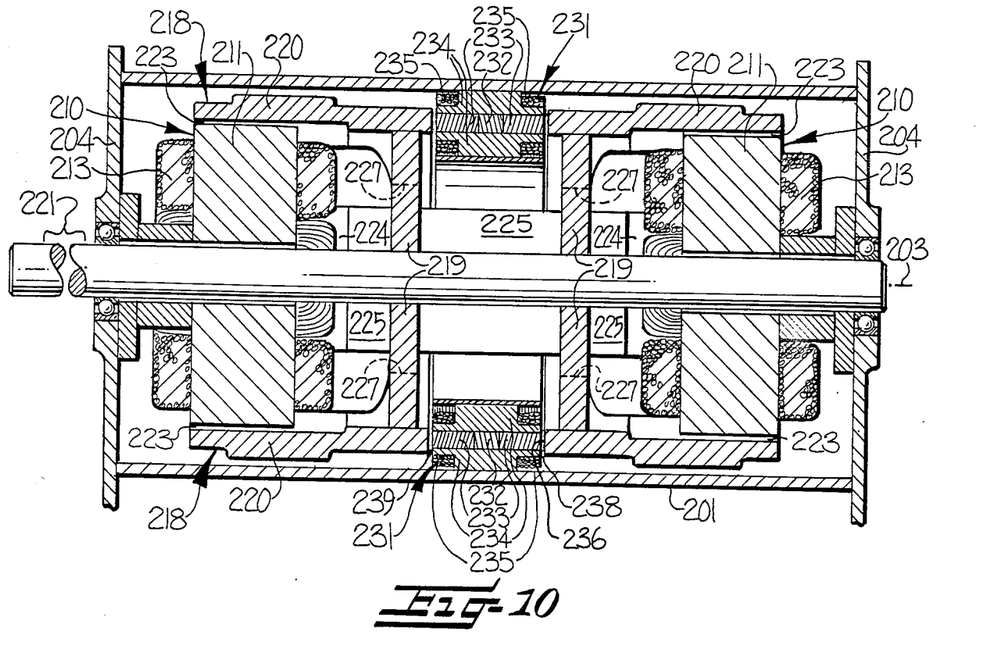
FIG. 10 is a cross-sectional view of the machine of FIG. 9 rotated 90°, taken along the longitudinal axis of the machine.
Figure 16:
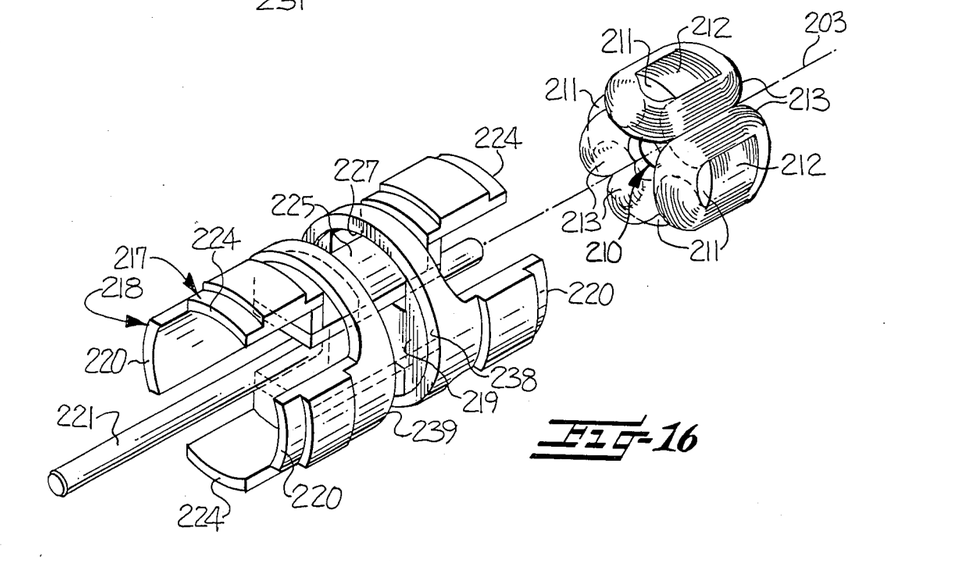
FIG. 16 is a perspective view, partially exploded, of the rotor and one stator of the machine illustrated in FIGS. 9-15.

The rotor shunt components 217 are generally saddle-shaped and are radially displaced from the shaft 221. Referring primarily to FIGS. 9 and 16, the shunt includes cantilevered arm portions 224 that extend axially over the stator pole faces 212 forming an air gap 226. A magnetically permeable shunt bridge section 225 connects the proximate portion of the shunt arms and forms a part of the magnetic circuit linking the two stators. The bridge section extends axially at a predetermined distance from the shaft, and is connected thereto via a magnetically non-permeable rotor support 228. The shunt component is magnetically isolated from the main component and passes through apertures 227 defined in the disk component. The spacing between the shunt and main rotor components is large compared to the air gaps in the machine to minimize flux leakage.

The magnetic means 231 includes an annular ring of permanent magnets 232 magnetized coaxially with the central axis 203. A pair of magnetically permeable annular collector rings 233 are disposed on either side of the permanent magnets and are magnetically linked thereto. The magnets form a continuous ring, as does the collector, to provide a substantially continuous and unbroken surface and even distribution of the magnetic flux. A pair of magnetically non-permeable spools 234 sandwich the permanent magnets and collector rings radially and are provided with voltage regulation windings 235 that, when energized, add to or detract from the magnetic field from the permanent magnets 232. The collector rings, permanent magnets, and spool may be fastened to the case in any convenient manner, such as illustrated in FIG. 9.

The collector rings and spool together focus the magnetic flux from the permanent magnets and voltage regulations windings into a pair of pole faces 236 that, together with the disk 219 of the rotor main component, form air gaps 238 and 239.

Figures 11, 12, 13, 14, 15:
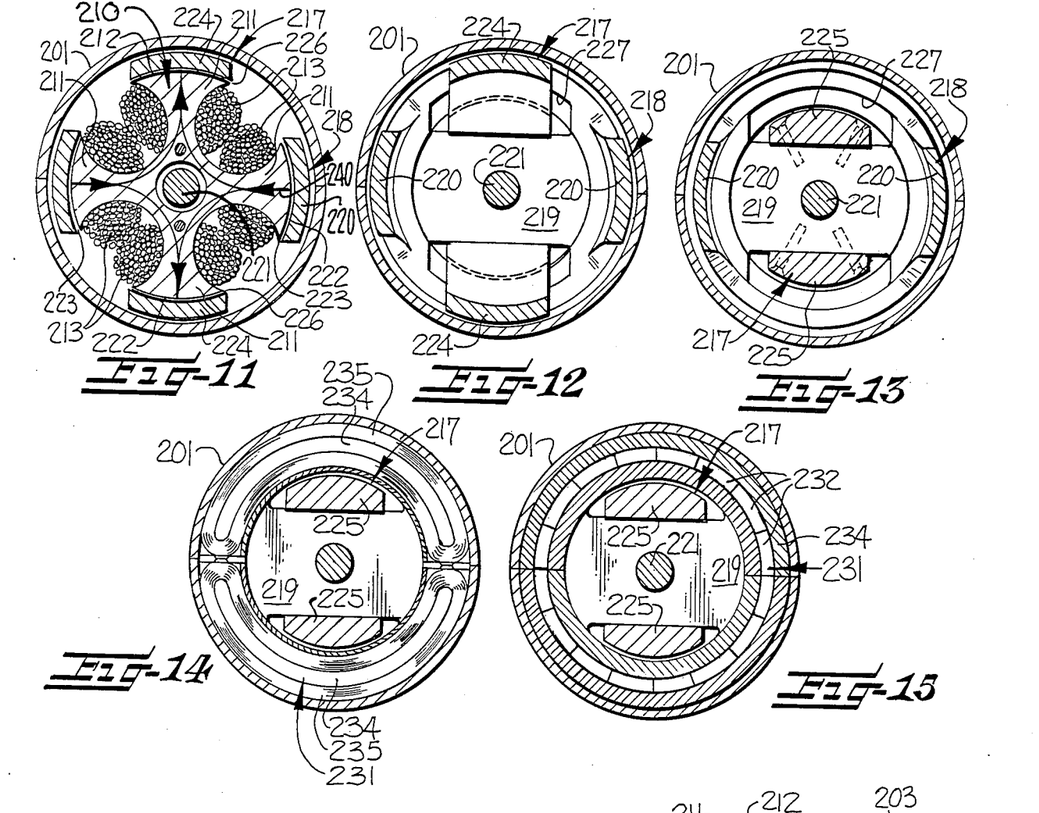
FIG. 11 is a cross-sectional view taken along line 11—11 of FIG. 9.
FIG. 12 is a cross-sectional view taken along line 12—12 of FIG. 9.
FIG. 13 is a cross-sectional view taken along line 13—13 of FIG. 9.
FIG. 14 is a cross-sectional view taken along line 14—14 of FIG. 9.
FIG. 15 is a cross-sectional view taken along line 15—15 of FIG. 9.

Referring to FIG. 10–16 an exemplary flux path 240 is illustrated. Beginning with the magnetic means 231 disposed between the rotor main disks 219, the flux flows axially out of the magnetic means 231, across air gap 239, into rotor disk 219 and main rotor component arm 220. The flux continues radially out of the rotor arm 220, across air gap 223, and into pole face 212 and stator 210. Referring also to FIG. 11, the flux splits in the stator and continues radially outwardly to adjacent pole faces 212, across air gaps 226 and into the shunt arm 224. The flux continues axially through the shunt arm 224, shunt bridge 225, and into the opposite shunt arm 224. The flux then moves radially inwardly from shunt arm 224, across the air gap 226 to re-enter pole face 212 and the stator 210. The flux again splits in the second stator and moves radially outwardly through pole face 212, across air gap 223, and into arm 220 of the main rotor component. The flux continues axially through the main rotor arm to the disk 219, across air gap 238 back to the magnetic means 231. The flux flow is unidirectional in the rotor regardless of the rotational position. The flux flow in the stator alternates direction as the alternating faces of the rotor shunt and main component are placed into magnetic circuit with successive stator poles. When operated as a motor, the electrical windings are pulsed by a suitable controller to control the magnitude and direction of the flux. When operated as a generator, the flux flow through the electrical coils generates electricity. Although not illustrated, the flux flows in substantially all portions of the stator and rotor at all times, to maximize the efficiency of the machine.

This embodiment illustrates two stators that are in magnetic circuit, although it could be modified by one skilled in the art to be a single stator machine.

What is claimed is:

1. A full flux reversal variable reluctance brushless machine comprising
   an annular, magnetically permeable stator having a plurality of fixed poles faces that define an annular stator surface and a central axis;
   at least one electrical winding surrounding at least one portion of the stator;
   a magnetically permeable rotor including a shaft mounted for rotation about the central axis and in magnetic circuit with certain of the pole faces of the stator, the rotor comprising
      a main component defining alternate sections of high and low magnetic permeability for varying the magnetic permeability between a first set of non-adjacent stator poles during rotation of the rotor, and
      a shunt component magnetically isolated from the main component, the shunt component defining alternate sections of high and low magnetic permeability that are circumferentially complementary to the sections of high and low magnetic permeability of the main cylindrical component for varying the magnetic permeability between a second set of non-adjacent stator poles to form a magnetic circuit from the first set of stator poles and the main component; and
   magnetic means for generating a radially oriented magnetic flux with respect to the rotor shaft, the magnetic means being annularly shaped having poles radially aligned with poles of one polarity in magnetic circuit with the rotor main component and poles of the other polarity in magnetic circuit with the rotor shunt component, and being disposed between the main and shunt rotor components, and such that rotation of the rotor induces variations in flux magnitude and flux direction in the stator without reversing flux direction in the rotor.

2. The machine of claim 1 wherein the stator comprises a plurality of radially inwardly extending poles.

3. The machine of claim 1 wherein the stator comprises a plurality of poles with each pole being in magnetic circuit with each other pole.

4. The machine of claim 1 wherein the stator comprises pole faces defining a cylindrical stator surface.

5. The machine of claim 1 wherein the rotor is generally cylindrically shaped.

6. The machine of claim 1 wherein the rotor is free of electrical windings.

7. The machine of claim 1 wherein the rotor is free of laminations.

8. The machine of claim 1 wherein the outer surface of the rotor is in magnetic circuit with certain of the pole faces of the stator via an air gap.

9. The machine of claim 1 wherein the main rotor component has a generally cylindrical configuration.

10. The machine of claim 1 wherein the main rotor component and shunt rotor component are fixed out of phase with respect to each other.

11. The machine of claim 1 wherein the main rotor component comprises a cylinder of highly permeable material mounted coaxially with the central axis, the cylinder defining apertures therethrough at predetermined locations, so that the highly permeable material comprises the sections of high permeability and the sections of low permeability are defined by the apertures.

12. The machine of claim 1 wherein the shunt rotor component comprises a shaft of highly permeable material that is coaxial with the central axis, the shaft including a predetermined number of integral, radially extending shunt segments of highly permeable material, so that the shaft segments of highly permeable material comprise the sections of high magnetic permeability and the sections of low magnetic permeability are between the shunt segments.

13. The machine of claim 12 wherein the shunt segments include an outer surface defining a segment of a cylinder having an axis that is coaxial with the central axis.

14. The machine of claim 1 wherein the main rotor component comprises a cylinder of highly permeable material that is coaxial with the central axis, the cylinder defining apertures therethrough at predetermined locations, and wherein the shunt rotor component comprises a shaft of highly permeable material that is coaxial with the central axis, the shaft including a predetermined number of shunt segments of highly permeable material that extend radially through the main rotor component apertures.

15. The machine of claim 14 wherein the shunt segments include an outer surface defining a segment of a cylinder that substantially coincides with the outer surface of the main rotor component cylinder.

16. The machine of claim 1 wherein the magnetic means comprises permanent magnets.

17. The machine of claim 1 wherein the magnetic means comprises electromagnets.

18. The machine of claim 1 wherein the magnetic means comprises electromagnets and permanent magnets.

19. The machine of claim 1 wherein the magnetic means is in magnetic circuit with the main rotor component via an air gap.

20. The machine of claim 1 wherein the magnetic means is in magnetic circuit with the shunt rotor component via an air gap.

21. The machine of claim 1 wherein the magnetic means is in contact with the rotor and rotates therewith.

22. The machine of claim 1 wherein the magnetic means is stationary.

23. The machine of claim 1 wherein the magnetic means comprises a plurality of means for generating a magnetic flux.

24. The machine of claim 1 wherein the electrical windings are stationary.

25. The machine of claim 1 wherein all magnetically permeable elements are in the magnetic circuit at substantially all times.

26. The machine of claim 1 wherein the stator and rotor are free of perforations.

27. The machine of claim 1 wherein the magnetic means comprises means for generating a generally linear, radial flux path segment extending throught the magnetic means and adjacent air gaps to the respecive surfaces of the main and shunt rotor components.

28. A full flux reversal variable reluctance brushless machine comprising
an annular, magnetically permeable stator having a plurality of fixed poles having pole faces that define a cylindrical stator surface and a central axis;
at least one electrical winding surrounding at least one portion of the stator;
a magnetically permeable rotor including a shaft for rotation about the central axis and in magnetic circuit with certain of the pole faces of the stator, the rotor comprising
a main cylindrical component defining alternate sections of high and low magnetic permeability for varying the magnetic permeability between a first pair of non-adjacent stator poles during rotation of the rotor,
a shunt component magnetically isolated from the main component and fixed out of phase with respect thereto, the shunt component defining alternate sections of high and low magnetic permeability that are circumferentially complementary to the sections of high and low magnetic permeability of the main cylindrical component for varying the magnetic permeability between a second pair of non-adjacent stator poles to form a magnetic circuit with the first pair of stator poles and the main component; and
magnetic means for generating a magnetic flux, the magnetic means in magnetic circuit with the main and shunt rotor components, and such that rotation of the rotor induces variations in flux magnitude and flux direction in the stator without reversing flux direction in the rotor.

29. The machine of claim 28 where in the stator comprises a plurality of radially outwardly extending fixed poles, and wherein the rotor is generally cylindrically shaped with the inner surface of the rotor being in magnetic circuit with certain of the pole faces of the stator via an air gap.

30. The machine of claim 28 wherein the main rotor component comprises longitudinally extending cylindrical arm sections of highly permeable magnetic material mounted coaxial to the central axis, the arm sections defining longitudinally extending slots at predetermined locations, and wherein the shunt rotor component comprises magnetically isolated saddle shaped elements of highly permeable magnetic material having a longitudinal axis coaxial with the central axis and a distal portion extending into a slot defined by the main rotor component.

31. The machine of claim 28 wherein the main rotor component comprises a pair of coaxial cylinders of equal diameter defining a zone therebetween, and wherein the magnetic means is disposed in the zone and is magnetically linked only with the pair of coaxial cylinders.

32. The machine of claim 28 wherein the magnetic means is annularly shaped having poles axially aligned, with one pole in magnetic circuit with one of the rotor components and the other pole in magnetic circuit with the other of the rotor components.

33. The machine of claim 28 wherein the magnetic means is stationary and magnetically linked to each of the two rotor components via air gaps.

* * * * *

UNITED STATES PATENT AND TRADEMARK OFFICE
CERTIFICATE OF CORRECTION

PATENT NO. : 4,757,224

DATED : July 12, 1988

INVENTOR(S) : Daniel W. McGee; Frederick B. Reiter; Vamaraju S.R. Murthy

It is certified that error appears in the above-identified patent and that said Letters Patent is hereby corrected as shown below:

Column 6, line 6: Delete "bushless" and insert -- brushless --

Column 9, line 65: After "poles" insert -- having pole --

Column 12, line 3: After "shaft" insert -- mounted --

Signed and Sealed this

Eighth Day of November, 1988

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,757,224

DATED : July 12, 1988

INVENTOR(S) : Daniel W. McGee, et al.

It is certified that error appears in the above-identified patent and that said Letters Patent is hereby corrected as shown below:

Column 10, line 18: after "magnetic circuit", delete "from" and insert -- with --.

Signed and Sealed this

Third Day of September, 1991

Attest:

HARRY F. MANBECK, JR.

*Attesting Officer*   *Commissioner of Patents and Trademarks*